United States Patent
Sumida et al.

(10) Patent No.: US 9,059,453 B2
(45) Date of Patent: Jun. 16, 2015

(54) BATTERY, BATTERY SEPARATOR AND METHOD FOR PRODUCING BATTERY SEPARATOR

(71) Applicant: Panasonic Corporation, Osaka (JP)

(72) Inventors: Hiroto Sumida, Nara (JP); Takahiro Kurokawa, Osaka (JP); Takayoshi Yamaguchi, Osaka (JP); Takatoshi Mitsushima, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/110,419

(22) PCT Filed: Jan. 16, 2013

(86) PCT No.: PCT/JP2013/000158
§ 371 (c)(1),
(2) Date: Oct. 7, 2013

(87) PCT Pub. No.: WO2013/179526
PCT Pub. Date: Dec. 5, 2013

(65) Prior Publication Data
US 2014/0227602 A1    Aug. 14, 2014

(30) Foreign Application Priority Data
May 30, 2012 (JP) ................................. 2012-123712

(51) Int. Cl.
*H01M 2/16* (2006.01)
*H01M 2/14* (2006.01)
(Continued)

(52) U.S. Cl.
CPC .......... *H01M 2/162* (2013.01); *Y10T 29/49115* (2015.01); *B32B 37/20* (2013.01); *B32B 37/24* (2013.01); *H01M 2/145* (2013.01); *H01M 2/1686* (2013.01); *H01M 10/052* (2013.01)

(58) Field of Classification Search
CPC ... H01M 2/145; H01M 2/162; H01M 2/1686; H01M 10/052; B32B 37/20; B32B 37/24; Y10T 29/49115
USPC .................... 429/129, 246, 247; 156/276, 324
See application file for complete search history.

(56) References Cited

U.S. PATENT DOCUMENTS

2007/0009776 A1 *   1/2007  Nodono ........................... 429/30
2008/0070463 A1     3/2008  Arora et al.
(Continued)

FOREIGN PATENT DOCUMENTS

EP    2052426 A1    12/2006
EP    2064379 A2     6/2009
(Continued)

OTHER PUBLICATIONS

International Search Report in PCT/JP2013/000158 mailed Apr. 23, 2013, 3 pages.

*Primary Examiner* — Milton I Cano
*Assistant Examiner* — Ling R Zeng
(74) *Attorney, Agent, or Firm* — McDermott Will & Emery LLP

(57) ABSTRACT

A battery includes a positive electrode, a negative electrode, a separator interposed therebetween, and an electrolyte. The separator includes a plurality of nanofibers and has a form of a sheet having a first surface and a second surface opposite thereto. When the average maximum fiber diameter of the nanofibers in the plane direction of the separator is compared between in vicinities of the first and second surfaces and at a center portion in the thickness direction of the separator, average maximum fiber diameters Ds1 and Ds2 of the nanofibers in the vicinity of the first and second surfaces are smaller than an average maximum fiber diameter Dc of the nanofibers at the center portion in the thickness direction of the separator.

2 Claims, 4 Drawing Sheets

(51) Int. Cl.
*B32B 37/20* (2006.01)
*B32B 37/24* (2006.01)
*H01M 10/052* (2010.01)

(56) References Cited

U.S. PATENT DOCUMENTS

| | | |
|---|---|---|
| 2008/0213671 A1* | 9/2008 | Kogetsu et al. ............... 429/246 |
| 2009/0261035 A1 | 10/2009 | Arora et al. |
| 2010/0092687 A1* | 4/2010 | Sumida et al. ............... 427/472 |
| 2010/0233523 A1 | 9/2010 | Jo et al. |
| 2011/0048636 A1 | 3/2011 | Fukuhara |
| 2011/0177395 A1 | 7/2011 | Kamisasa |

FOREIGN PATENT DOCUMENTS

| | | |
|---|---|---|
| EP | 2314448 A1 | 4/2011 |
| EP | 2325361 A1 | 5/2011 |
| JP | 11-126595 A | 5/1999 |
| JP | 2002-124242 A | 4/2002 |
| JP | 2010-500717 A | 1/2010 |
| JP | 2010-504444 A | 2/2010 |
| JP | 2010-225809 A | 10/2010 |
| WO | 2008/018656 A1 | 1/2008 |
| WO | 2008/036332 A2 | 3/2008 |
| WO | 2010/007762 A1 | 1/2010 |
| WO | 2010/027063 A1 | 3/2010 |
| WO | 2012/008559 A1 | 1/2012 |

* cited by examiner

BATTERY, BATTERY SEPARATOR AND METHOD FOR PRODUCING BATTERY SEPARATOR

RELATED APPLICATIONS

This application is the U.S National Phase under 35 U.S.C. §371 of International Application No. PCT/JP2013/000158, filed on Jan. 16, 2013, which in turn claims the benefit of Japanese Application No. 2012-123712, filed on May 30, 2012, the disclosures of which are incorporated by reference herein.

TECHNICAL FIELD

The present invention relates to a battery, a battery separator, and a method for producing a battery separator, and specifically relates to an improvement of a battery separator.

BACKGROUND ART

Nanofibers are extremely thin fibers with diameters from several tens to several hundreds nanometers, and exhibit physical properties different from those of conventional fibers when the fibers are made extremely thin. Therefore, nanofibers themselves or nanofiber products (e.g. nonwoven fabric) have been attracting attention in various fields such as those of energy, biotechnology, and health care. In particular, nanofiber nonwoven fabrics are expected to be widely used, since the pore diameter thereof can be made smaller than that of conventional nonwoven fabrics because of the small fiber diameter of nanofibers.

For example, in the energy field, nanofiber nonwoven fabrics are expected to be used as an electrolyte membrane support in fuel cells, or as a separator in primary or secondary batteries such as alkaline batteries or lithium batteries.

Patent Literature 1 discloses that a separator comprising a porous layer which includes nanofibers formed by electrospinning is integrally joined to an electrode surface. In Patent Literature 1, the porous layer is formed by spraying and spinning a polymer solution for constituting nanofibers onto a surface of the substrate of the electrode. In Patent Literature 1, the porous layer of nanofibers is formed by direct electrospinning on the substrate of the electrode. According to these methods, as the polymer solution is sprayed, nanofibers deposit on the substrate.

CITATION LIST

Patent Literature

[PTL 1] Japanese Laid-Open Patent Publication No. 2010-225809

SUMMARY OF INVENTION

Technical Problem

However, as nanofibers deposit, the nanofibers in contact with the surface of the substrate become flattened as the shape of the substrate surface is transferred thereto. The flattened nanofibers have an increased maximum fiber diameter in the plane direction of the nanofiber nonwoven fabric, and thus have an increased contact area with the substrate surface. As a result, the contact resistance at the contact surface between the substrate and the porous layer increases, causing the battery performance to deteriorate.

When a nanofiber nonwoven fabric is formed separately and used as a separator, the nonwoven fabric is first formed on the substrate by electrospinning etc., and then removed from the substrate to be used. In this case also, as in Patent Literature 1, the condition of fibers in the porous layer will be different between the surface in contact with the substrate and the surface opposite to the surface in contact with the substrate, resulting in a difference therebetween in characteristics.

When such a nanofiber nonwoven fabric is used as a separator, since the surface where the nanofibers are flattened and have an increased maximum fiber diameter in the plane direction of the nanofiber nonwoven fabric is brought into contact with either one of the electrodes, the contact resistance is increased. As a result, the battery characteristics will be deteriorated.

Solution to Problem

The present invention intends to provide a battery having a reduced contact resistance at the contact surfaces between the separator and the electrodes, a battery separator capable of reducing the contact resistance with the electrodes, and a method for producing the same.

One aspect of the present invention relates to a battery including a positive electrode, a negative electrode, a separator interposed between the positive electrode and the negative electrode, and an electrolyte. The separator has a matrix structure of nanofibers formed by electrospinning and has a form of a sheet having a first surface and a second surface opposite to the first surface. When the average maximum fiber diameter of the nanofibers in the plane direction of the separator is compared between in vicinities of the first surface and the second surface and at a center portion in the thickness direction of the separator, an average maximum fiber diameter $Ds1$ of the nanofibers in the vicinity of the first surface and an average maximum fiber diameter $Ds2$ of the nanofibers in the vicinity of the second surface is smaller than an average maximum fiber diameter $Dc$ of the nanofibers at the center portion in the thickness direction of the separator.

Another aspect of the present invention relates to a battery separator having a matrix structure of nanofibers formed by electrospinning and having a form of a sheet having a first surface and a second surface opposite to the first surface. When the average maximum fiber diameter of the nanofibers in the plane direction of the separator is compared between in vicinities of the first surface and the second surface and at a center portion in the thickness direction of the separator, an average maximum fiber diameter $Ds1$ of the nanofibers in the vicinity of the first surface and an average maximum fiber diameter $Ds2$ of the nanofibers in the vicinity of the second surface is smaller than an average maximum fiber diameter $Dc$ of the nanofibers at the center portion in the thickness direction of the separator.

Yet another aspect of the present invention relates to a method for producing a battery separator. The method includes the steps of: (i) feeding a substrate sheet into a nanofiber-forming space; (ii) in the nanofiber-forming space, forming nanofibers by electrostatic force from a raw material solution including a solvent and a resin raw material dissolved in the solvent, and depositing the formed nanofibers on the principal surface of the substrate sheet to form a porous sheet having a matrix structure of nanofibers; and (iii) joining a pair of the porous sheets to each other, with the surfaces having been in contact with the principal surface of the substrate sheet facing each other, to form a battery separator having a first surface and a second surface opposite to the first surface. The first and second surfaces correspond to the surfaces of the pair of the porous sheets not having been in contact with the principal surface of the substrate sheet.

Still another aspect of the present invention relates to a method for producing a battery separator in which: long first and second substrate sheets are conveyed from upward toward downward of first and second lines, respectively, to form first and second porous sheets on the principal surfaces of the first and second substrate sheets on the upstream side of the lines, respectively; and the first and second porous sheets are joined face to face on the downstream side of the lines. The method includes the steps of: (i) conveying the first and second substrate sheets into nanofiber-forming spaces on the upstream side of the first and second lines, respectively; (ii) in the nanofiber-forming spaces, forming nanofibers by electrostatic force from a raw material solution including a solvent and a resin raw material dissolved in the solvent, and depositing the formed nanofibers on the principal surfaces of the conveyed first and second substrate sheets, respectively, to form first and second porous sheets each having a matrix structure of nanofibers; (iii) removing the first and second substrate sheets from the conveyed first and second porous sheets, on the downstream side of the first and second lines; and (iv) joining the conveyed first and second porous sheets to each other on the further downstream side of the first and second lines, with surfaces having been in contact with the principal surfaces of the first and second substrate sheets facing each other, to form a nanofiber sheet.

Still yet another aspect of the present invention relates to a nanofiber sheet having a matrix structure of nanofibers formed by electrospinning and having a first surface and a second surface opposite to the first surface. When the average maximum fiber diameter of the nanofibers in the plane direction of the nanofiber sheet is compared between in vicinities of the first surface and the second surface and at a center portion in the thickness direction of the nanofiber sheet, an average maximum fiber diameter $Ds1$ of the nanofibers in the vicinity of the first surface and an average maximum fiber diameter $Ds2$ of the nanofibers in the vicinity of the second surface is smaller than an average maximum fiber diameter $Dc$ of the nanofibers at the center portion in the thickness direction of the nanofiber sheet.

Advantageous Effects of Invention

According to the present invention, the separator has a matrix structure of nanofibers formed by electrospinning, but despite this, the average maximum fiber diameter of the nanofibers in the plane direction of the separator can be made smaller in the vicinities of both surfaces of the separator than at the center portion in the thickness direction of the separator. Therefore, in the battery, the contact resistance at the contact surfaces between the separator and the electrodes can be reduced.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

[Battery]

A battery includes a positive electrode, a negative electrode, a separator interposed between the positive electrode and the negative electrode, and an electrolyte. The separator is one that has a matrix structure of nanofibers formed by electrospinning and has a form of a sheet having a first surface and a second surface opposite thereto (hereinafter sometimes simply referred to as a "nanofiber sheet").

In the nanofiber sheet (separator), when the average maximum fiber diameter of the nanofibers in the plane direction of the nanofiber sheet is compared between in vicinities of the first and second surfaces and at a center portion in the thickness direction of the nanofiber sheet, an average maximum fiber diameter $Ds1$ of the nanofibers in the vicinity of the first surface and an average maximum fiber diameter $Ds2$ of the nanofibers in the vicinity of the second surface are smaller than an average maximum fiber diameter $Dc$ of the nanofibers at the center portion in the thickness direction of the nanofiber sheet.

(Nanofiber Sheet)

Nanofiber nonwoven fabrics are conventionally produced by depositing nanofibers on a substrate by means of, for example, electrospinning. Therefore, the nanofibers in contact with the surface of the substrate become flattened as the shape of the substrate surface is transferred thereto. In the resultant nonwoven fabric, the fibers at the surface on the side in contact with the substrate are flattened. If this nonwoven fabric having a surface at which the fibers are flattened is used as a battery separator, the surface with flattened fibers comes in contact with the electrode, and the contact area is increased, causing the contact resistance to increase. As a result, the battery characteristics such as charge/discharge characteristics deteriorate.

In the present invention, nanofiber nonwoven fabrics as mentioned above are laminated to each other, with the surfaces at which the fibers are flattened facing each other, to form a nanofiber sheet. Therefore, in the nanofiber sheet, despite of being formed by electrospinning, the nanofibers in the vicinities of both surfaces of the nanofiber sheet, unlike the conventional ones, are not in a flattened state.

More specifically, the nanofiber sheet of the present invention can be obtained by: for example, depositing nanofibers on the principal surface of a substrate sheet by electrospinning to form thereon a porous sheet (nanofiber nonwoven fabric) having a matrix structure of nanofibers; removing the porous sheet from the principal surface of the substrate sheet; preparing a pair of the porous sheets; and joining the pair of the porous sheets to each other, with the surfaces having been in contact with the principal surface of the substrate sheet facing each other. The production method of the nanofiber sheet will be hereinafter described in more details.

Figure 1:
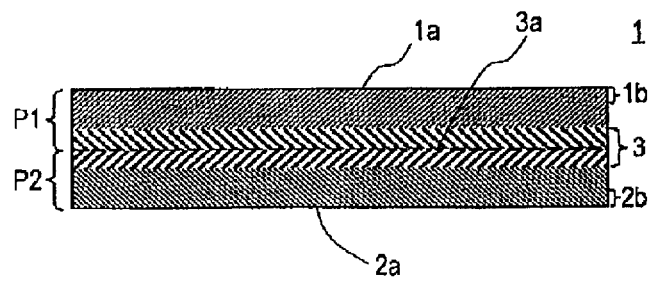
FIG. 1 A schematic diagram of a cross section of a nanofiber sheet of one embodiment of the present invention FIG. 2 A schematic longitudinal cross-sectional view of a cylindrical battery according to one embodiment of the present invention FIG. 3 A schematic view of a production system for carrying out a production method of a nanofiber sheet (or battery separator) according to one embodiment of the present invention FIG. 4A A schematic top view of a porous-sheet-forming unit 40 of FIG. 3

FIG. 1 is a schematic diagram of a cross section of the nanofiber sheet for explaining the fiber structure of the nanofiber sheet.

As illustrated in FIG. 1, a nanofiber sheet 1 has a first surface 1a and a second surface 2a opposite to the first surface 1a, and has a structure in which a first porous sheet P1 and a second porous sheet P2 are laminated to each other. The first porous sheet P1 is joined to the second porous sheet P2, with the surfaces having been in contact with the principal surface of the substrate sheet facing each other. Therefore, in a vicinity 3 of a joining face 3a (specifically, a center portion in the thickness direction of the nanofiber sheet 1), fibers are flattened.

On the other hand, the first and second surfaces 1a and 2a of the nanofiber sheet 1 correspond to the surfaces of the porous sheets P1 and P2 not having been in contact with the substrate sheets, respectively. Therefore, the fibers are not flattened in a vicinity 1b of the first surface and a vicinity 2b of the second surface. Hence, when the average maximum fiber diameter of the nanofibers in the plane direction of the nanofiber sheet is compared between in the vicinities 1b and 2b of the first and second surfaces and at the center portion in the thickness direction of the nanofiber sheet, the average maximum fiber diameter $Ds1$ of the nanofibers in the vicinity 1b of the first surface and the average maximum fiber diameter $Ds2$ of the nanofibers in the vicinity 2b of the second surface are smaller than the average maximum fiber diameter $Dc$ of the nanofibers in the vicinity 3 of the joining face 3a (specifically, the center portion in the thickness direction) in the nanofiber sheet 1.

As described above, in the nanofiber sheet, at its surfaces, the average maximum fiber diameter of the nanofibers in the plane direction of the nanofiber sheet is small. When the nanofiber sheet is used as a separator and brought into contact with the electrodes, the increase in contact area can be suppressed. Accordingly, the increase in contact resistance is suppressed, and therefore, the deterioration in battery characteristics can be suppressed.

Besides, in the nanofiber sheet, the fibers in the vicinities of both surfaces are not flattened, which allows many gaps to be kept between fibers. In addition, the nanofiber sheet generally has a high porosity. Therefore, when used as separator, the nanofiber sheet can quickly absorb electrolyte, and can retain much electrolyte in the gaps. This ensures high ion conductivity, and therefore, the charge/discharge characteristics can be improved.

Furthermore, usually, nonwoven fabrics easily have pinholes because of their high porosity. In the present invention, however, the matrix structure of nanofibers can effectively prevent the occurrence of pinholes.

"Nanofibers" are filiform elements made of a polymeric material such as a polymer and having a fiber diameter of 50 to 800 nm.

The maximum fiber diameter in the plane direction of the nanofiber sheet means, when one nanofiber is seen on the fiber cross section (cross section in the width direction of the fiber), a fiber width which is largest in the plane direction of the nanofiber sheet. The average maximum fiber diameter means an average value of the maximum fiber diameters of multiple (e.g. 10) nanofibers randomly selected on the cross section of the nanofiber sheet in the thickness direction thereof. The maximum fiber diameter in the plane direction of the nanofiber sheet is sometimes simply referred to as a maximum fiber diameter.

The average maximum fiber diameter $Dc$ means an average value of the maximum fiber diameters of the nanofibers in the vicinity of a flat plane (or joining face between porous sheets) which runs through the center portion in the thickness direction of the nanofiber sheet and is parallel to the surfaces of the nanofiber sheet.

The center portion in the thickness direction of the nanofiber sheet is preferably located at or in the vicinity of the center in the thickness direction, but is not necessarily located at or in the vicinity of the center. The nanofiber sheet of the present invention is sufficed if the interior of the nanofiber sheet has a region where the average maximum fiber diameter of the nanofibers is larger. For example, the region where the average maximum fiber diameter of the nanofibers is larger may be included in an area which extends across a flat plane (or the joining face between porous sheets) parallel to the surfaces of the nanofiber sheet. The thickness of the area is 10 to 40% of the overall thickness of the sheet.

The vicinity of a flat plane as indicated by reference numeral 3 in FIG. 1 which runs through the center portion in the thickness direction of the nanofiber sheet and is parallel to the surfaces of the nanofiber sheet means, for example, an area which extends across the flat plane and whose thickness is 10 to 30% of the overall thickness of the sheet.

The average maximum fiber diameter $Dc$ is, for example, 60 nm to 2 μm, preferably 100 nm to 1.2 μm, and more preferably 200 to 1000 nm.

In the nanofiber sheet, in the vicinities of both surfaces thereof, the average maximum fiber diameters $Ds1$ and $Ds2$ of the nanofibers are comparatively small. Therefore, very fine pores are formed uniformly. When the nanofiber sheet is interposed as a separator between the positive and negative electrodes, the distribution of electrolyte at the interfaces becomes uniform. Accordingly, with respect to each of both electrodes, the contact resistance can be reduced. In short, comparatively constant properties can be easily obtained at both surfaces of the sheet, and therefore, the battery characteristics can be stabilized.

The average maximum fiber diameter $Ds1$ of the nanofibers in the vicinity of the first surface means an average value of the maximum fiber diameters of the nanofibers present in the vicinity of the first surface. Likewise, the average maximum fiber diameter $Ds2$ of the nanofibers in the vicinity of the second surface means an average value of the maximum fiber diameters of the nanofibers present in the vicinity of the second surface.

The vicinity of the first surface means, for example, an area which extends from the first surface of the nanofiber sheet and whose thickness is 10% of the overall thickness of the sheet. Likewise, the vicinity of the second surface means, for example, an area which extends from the second surface of the nanofiber sheet and whose thickness is 10% of the overall thickness of the sheet.

In the nanofiber sheet, the average maximum fiber diameter $Ds1$ and the average maximum fiber diameter $Ds2$ preferably satisfy $0.9 \leq Ds1/Ds2 \leq 1.1$, and more preferably satisfy $0.95 \leq Ds1/Ds2 \leq 1.05$. When $Ds1$ and $Ds2$ satisfy such relationship, the physical properties at both surfaces of the nanofiber sheet can be advantageously made more uniform.

The average maximum fiber diameters $Ds1$ and $Ds2$ c are each, for example, 50 to 800 nm, preferably 60 to 500 nm, and more preferably 70 to 200 nm. When the average maximum fiber diameters at both surfaces of the nanofiber sheet are within such a range, and when the nanofiber sheet is used as a separator, the contact resistance with the electrodes can be more effectively reduced.

Ds1 and Dc satisfy the relationship, for example, $1.1 \leq Dc/Ds1 \leq 2.5$, preferably $1.2 \leq Dc/Ds1 \leq 2.2$, and more preferably $1.3 \leq Dc/Ds1 \leq 2$. Ds2 and Dc satisfy the relationship, for example, $1.1 \leq Dc/Ds2 \leq 2.5$, preferably $1.2 \leq Dc/Ds2 \leq 2.2$, and more preferably $1.3 \leq Dc/Ds2 \leq 2$. When the nanofiber sheet satisfies such relationship between the maximum fiber diameters, and when the nanofiber sheet is used as a separator, the contact resistance with the electrodes can be more effectively reduced.

The nanofiber sheet has an average porosity P of, for example, 50 to 95%, preferably 60 to 92%, and more preferably 70 to 90%.

In the nanofiber sheet, a porosity Ps1 in the vicinity of the first surface and a porosity Ps2 in the vicinity of the second surface preferably satisfy $0.9 \leq Ps1/Ps2 \leq 1.1$, and more preferably satisfy $0.95 \leq Ps1/Ps2 \leq 1.05$. When Ps1 and Ps2 satisfy such relationship, the physical properties at both surfaces of the nanofiber sheet can be advantageously made more uniform.

When the thicknesses of the first and second porous sheets are nearly equal to each other, the joining face is located at the center in the thickness direction of the nanofiber sheet. The joining face is not necessarily located at the center in the thickness direction of the nanofiber sheet, but is preferably located at the center or in the vicinity thereof.

The nanofiber sheet is not necessarily formed symmetrically with respect to a boundary, i.e., with respect to the joining face between porous sheets or the center portion in the thickness direction of the nanofiber sheet, but preferably has a symmetric structure. Specifically, provided that the nanofiber sheet is divided into a first region including the first surface and a second region including the second surface, with the center in the thickness direction of the nanofiber sheet (specifically, a flat surface running through the center and being parallel to the surfaces of the nanofiber sheet) being a boundary between the first region and the second region, the first region and the second region are preferably symmetric in structure with respect to the boundary. In the nanofiber sheet having such a structure, physical properties become more uniform between on the first-surface side and on the second-surface side.

The nanofiber sheet has a matrix structure of nanofibers, and usually is in the form of a nonwoven fabric.

In the matrix structure of nanofibers, the nanofibers may be bonded to one another at their contact points or separated from one another without being bonded at their contact points. The nanofibers may be randomly bonded to one another in the matrix structure.

Furthermore, if necessary, a solution containing a binder such as a polymer may be applied to the matrix structure of nanofibers by impregnation or application, or contained in the raw material of nanofibers, so that the nanofibers are bonded to one another with the binder.

In the nanofiber sheet, more nanofibers may be bonded to one another in the vicinity of the center portion in the thickness direction than in the vicinities of both surfaces.

In electrospinning, nanofibers are formed by spinning a polymer solution or molten polymer. Therefore, the nanofibers may be bonded to one another by welding or fusing.

In the electrospinning using a polymer solution, if nanofibers are deposited but the solvent is not completely vaporized and the nanofibers are swelled with the solvent, the nanofibers are compatibilized at the contact points by the action of the solvent. After the solvent has been vaporized, the nanofibers are welded to one another.

In the electrospinning using a molten polymer, during deposition of nanofibers, if the nanofibers which are not yet completely solidified come in contact with one another and solidify in this state, the nanofibers are fused to one another at their contact points.

The polymeric material constituting the nanofibers such as a polymer (or resin raw material) may be of any type that can be electrospun, without limitation, and is exemplified by various thermoplastic polymers capable of melting, and polymers capable of dissolving in a solvent.

Examples of such polymers include: olefinic resins (e.g., homopolymers or copolymers containing ethylene and/or propylene as a monomer unit); vinyl resins (e.g., vinyl acetate resins such as polyvinyl acetates or ethylene-vinyl acetate copolymers, or saponificated products thereof (e.g., polyvinyl alcohols or modified products thereof); aromatic vinyl resins such as polystyrene or copolymers containing styrene as a monomer unit; and vinyl cyanide resins such as polyacrylonitrile); acrylic resins (e.g., homopolymers or copolymers containing acrylic acid ester or methacrylic acid ester as a monomer unit, such as polymethyl methacrylate); fluorocarbon resins; polyester resins (e.g., aliphatic polyesters such as polylactic acid and polycaprolactone, and aromatic polyesters); polyamide resins; polyimide resins; cellulose derivatives (e.g., cellulose ester, and cellulose ether); and biopolymers such as biodegradable polymers. These polymers may be used singly or in combination of two or more.

Preferred among the aforementioned polymers are olefin resins, fluorocarbon resins, polyamide resins, and polyimide resins. These polymers are advantageous in enhancing the permeability with electrolyte, when the nanofiber sheet is used as a battery separator. Polyamide resins and polyimide resins, which are excellent in heat resistance and thus are low in heat shrinkage, can more effectively suppress the internal resistance, when used for a battery separator.

Examples of the fluorocarbon resins include homopolymers or copolymers having fluorine-containing monomer units, such as polytetrafluoroethylene (PTFE), tetrafluoroethylene-hexafluoropropylene copolymer (FEP), tetrafluoroethylene-perfluoroalkyl vinyl ether copolymer (PFA), tetrafluoroethylene-ethylene copolymer, polyvinylidene fluoride (PVDF), and polyvinyl fluoride (PVF).

Examples of the polyamide resins include: aliphatic polyamides, such as polyamide 6 and polyamide 6-12; alicyclic polyamides; and aromatic polyamides, such as polyamide MDX-6 and aramid. In view of the heat resistance, aromatic polyamides, particularly, wholly aromatic polyamides such as aramid are preferred.

Examples of the polyimide resins include: thermosetting polyimides, such as condensation polyimides obtained from polyamic acid, and bismaleimide resins; and thermoplastic polyimides. Examples of the thermoplastic polyimides include polyimides containing benzophenone tetracarboxylic acid and diaminodiphenyl methane as monomer units, polyetherimide, polyamide-imide, and polyesterimide.

The nanofibers may include a known additive, if necessary, in addition to the polymer. The content of the additive is, for example, 5 mass % or less of the nanofiber sheet.

The thickness of the nanofiber sheet may be selected from the range of about 1 μm to about 1000 μm, depending on its use, and is, for example, from 5 to 200 μm, and preferably from 10 to 100 μm or from 15 to 70 μm.

In the battery of the present invention, the nanofiber sheet is interposed, as a battery separator, between the positive electrode and the negative electrode.

The battery may be of any type, without particular limitation, and is exemplified by: primary batteries, such as manganese dry batteries, alkaline dry batteries, and lithium primary batteries; secondary batteries, such as nickel-cadmium batteries, nickel metal hydride batteries, and lithium ion batteries. The nanofiber sheet, because of the low contact resistance at its surfaces, can suppress the deterioration in charge/discharge performance, and therefore, is particularly suitably applicable as a separator for secondary batteries. Among secondary batteries, lithium ion batteries are particularly preferred.

There is no particular limitation also to the shape of the battery. The battery, depending on its type etc., may be any one of coin, cylindrical, prismatic and laminate batteries.

The electrodes, electrode active material and electrolyte of the battery may be selected, as appropriate, depending on the type of the battery.

(Lithium Ion Battery)

The components of the battery are described below, with a lithium ion battery taken as an example.

In a lithium ion battery, the positive electrode includes a positive electrode active material capable of absorbing and releasing lithium ions, and the negative electrode includes a negative electrode active material capable of absorbing and releasing lithium ions. Depending on the shape of the battery, each of the positive and negative electrodes may be a pellet including an active material, or comprise a sheet-like current collector and an active material layer formed on the surface thereof including an active material. The pellet-like electrode and the active material layer may contain an active material and a binder.

(Positive Electrode)

The positive electrode current collector may be made of, for example, stainless steel, aluminum, aluminum alloy, or titanium. The positive electrode current collector may be a non-porous electrically conductive substrate or a porous electrically conductive substrate having a plurality of through-pores. The thickness of the positive electrode current collector may be selected from the range of, for example, 3 to 50 µm.

The positive electrode active material layer may be formed on both surfaces or one surface of the positive electrode current collector. The thickness of the positive electrode active material layer is, for example, 10 to 70 µm.

The positive electrode active material may be any one of known positive electrode active materials for non-aqueous electrolyte secondary batteries. Among them, for example, a lithium transition metal oxide having a crystal structure belonging to the hexagonal crystal structure, spinel structure or olivine structure is preferably used. These positive electrode active materials may used singly or in combination of two or more.

Examples of the lithium transition metal oxide include: $Li_xM^a_{1-y}M^b_yO_2$, where $0.9 \leq x \leq 1.1$, $0 \leq y \leq 0.7$, $M^a$ is at least one selected from the group consisting of Ni, Co, Mn, Fe, Ti etc., and $M^b$ is at least one metal element other than $M^a$; $LiMn_2O_4$; $LiFePO_4$; $LiCoPO_4$; and $LiMnPO_4$.

Examples of the lithium transition metal oxide represented by the above formula include: a lithium nickel oxide represented by $Li_xNi_{1-y}M^c_yO_2$, where $0.9 \leq x \leq 1.1$, $0 \leq y \leq 0.7$, $M^c$ is at least one selected from the group consisting of Co, Mn, Fe, Ti, Al, Mg, Ca, Sr, Zn, Y, Yb, Nb and As; a lithium cobalt oxide represented by $Li_xCo_{1-y}M^d_yO_2$, where $0.9 \leq x \leq 1.1$, $0 \leq y \leq 0.7$, $M^d$ is at least one selected from the group consisting of Ni, Mn, Fe, Ti, Al, Mg, Ca, Sr, Zn, Y, Yb, Nb and As; and a lithium manganese oxide.

In the lithium nickel oxide, y is preferably $0.05 \leq y \leq 0.5$. In the lithium cobalt oxide, y is preferably $0 \leq y \leq 0.3$.

Preferred examples of the lithium transition metal oxides represented by the above formulae include $LiNi_{1/2}Mn_{1/2}O_2$, $LiNiO_2$, $LiNi_{1/2}Fe_{1/2}O_2$, $LiNi_{0.8}Co_{0.15}Al_{0.05}O_2$, $LiNi_{1/3}Mn_{1/3}Co_{1/3}O_2$, $LiCoO_2$, and $LiMnO_2$.

Examples of the binder include: fluorocarbon resins, such as PVDF; acrylic resins, such as polymethyl acrylate and ethylene-methyl methacrylate copolymer; and rubber materials, such as styrene-butadiene rubber, acrylic rubber, and modified products of these.

The content of the binder is, for example, 0.1 to 10 parts by mass, and preferably 1 to 5 parts by mass per 100 parts by mass of the positive electrode active material.

The pellet-like positive electrode and the positive electrode active material layer can be formed by using a mixture of a positive electrode active material and a binder. The mixture usually contains a dispersion medium, and may further contain, for example, a thickener and a conductive agent, if necessary. The positive electrode active material layer can be formed by, for example, preparing a mixture (specifically, positive electrode slurry) containing these components, and applying the mixture onto a surface of the positive electrode current collector.

Examples of the dispersion medium include water, alcohols such as ethanol, ethers such as tetrahydrofuran, N-methyl-2-pyrrolidone (NMP), and mixed solvents of these.

The mixture such as a positive electrode slurry can be prepared by, for example, a method using a commonly available mixer or kneader. The positive electrode pellet can be obtained by, for example, forming the mixture into a pellet by a known method. The positive electrode slurry can be applied onto a surface of the positive electrode current collector by, for example, a commonly used application method using various coaters. After application, the applied film of positive electrode slurry is usually dried and pressed.

Examples of the conductive agent include: carbon blacks; electrically conductive fibers, such as carbon fibers; and fluorinated carbons. The content of the conductive agent is, for example, 0.1 to 7 parts by mass per 100 parts by mass of the positive electrode active material.

Examples of the thickener include: cellulose derivatives, such as carboxymethyl cellulose (CMC); and $polyC_{2-4}alkylene$ glycol, such as polyethylene glycol. The content of the thickener is, for example, is 0.1 to 10 parts by mass per 100 parts by mass of the positive electrode active material.

(Negative Electrode)

The negative electrode current collector is, for example, a copper foil or a copper alloy foil. The negative electrode current collector may be non-porous or porous. The shape and thickness of the negative electrode current collector are similar to those of the positive electrode current collector.

The negative electrode active material layer may be formed of a negative electrode active material, or may contain, for example, a binder, an electrically conductive agent, and a thickener, in addition to the negative electrode active material.

Various materials capable of reversibly absorbing and releasing lithium ions may be used as the negative electrode active material, and examples thereof include: carbonaceous materials, such as a material having a graphite-like crystal structure, a graphitizable carbon, and a non-graphitizable carbon; silicon; silicon-containing compounds, such as a silicon oxide; and lithium alloys containing Sn, Al, Zn and/or Mg. These negative electrode active materials may be used singly or in combination of two or more.

The material having a graphite-like crystal structure is exemplified by natural graphite, and spherical or fibrous artificial graphite.

When the negative electrode active material is a carbonaceous material such as a material having a graphite-like crystal structure, the particles thereof may be coated with a water-soluble polymer, such as a cellulose derivative, polyacrylic acid, or polyvinyl alcohol.

Examples of the binder, conductive agent, thickener and dispersion medium are similar to those exemplified for the positive electrode. The contents of the binder and the conductive agent per 100 parts by mass of the negative electrode active material can be selected from the ranges similar to those per 100 parts by mass of the positive electrode active material exemplified for the positive electrode.

The pellet-like negative electrode and the negative electrode active material layer can be formed by the method similar to those for forming the pellet-like positive electrode and the positive electrode active material layer. Depending on the type of the negative electrode active material, the negative electrode active material layer may be formed by depositing a negative electrode active material on a surface of the current collector by a vapor phase method such as vacuum vapor deposition or sputtering.

The negative electrode active material layer may be formed on one surface or both surfaces of the negative electrode current collector. The thickness of the negative electrode is, for example, 100 to 250 μm.

(Electrolyte)

In a lithium ion battery, the electrolyte is a non-aqueous electrolyte with lithium ion conductivity.

The non-aqueous electrolyte includes a non-aqueous solvent, and a lithium salt dissolved in the non-aqueous solvent.

Examples of the non-aqueous solvent include: cyclic carbonic acid esters, such as propylene carbonate and ethylene carbonate (EC); chain carbonic acid esters, such as diethyl carbonate, ethyl methyl carbonate (EMC), and dimethyl carbonate; and cyclic carboxylic acid esters, such as γ-butyrolactone and γ-valerolactone. These non-aqueous solvents may be used singly or in combination of two or more.

Examples of the lithium salt includes: $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These lithium salts may be used singly or in combination of two or more. The lithium salt concentration in the non-aqueous electrolyte is 0.5 to 1.8 mol/L.

The non-aqueous electrolyte may contain a known additive, for example, a vinylene carbonate compound such as vinylene carbonate.

(Others)

A lithium ion battery can be produced by a known method, depending on the shape of the battery. When the battery shape is cylindrical or prismatic, the battery can be produced by, for example, winding a positive electrode, a negative electrode, and a separator interposed therebetween to form an electrolyte group, and housing the electrode group and a non-aqueous electrolyte in a battery case.

The electrode group is not limited to a wound one, and may be a stacked one or a zigzag folded one. The electrode group may be in any shape, depending on the shape of the battery or battery case, and may be cylindrical or flat in which the end face perpendicular to the winding axis is elliptic.

The material of the battery case is, for example, aluminum, an aluminum alloy (e.g., an aluminum alloy containing a small amount of metal such as manganese or copper), or a stainless steel sheet.

Figure 2:
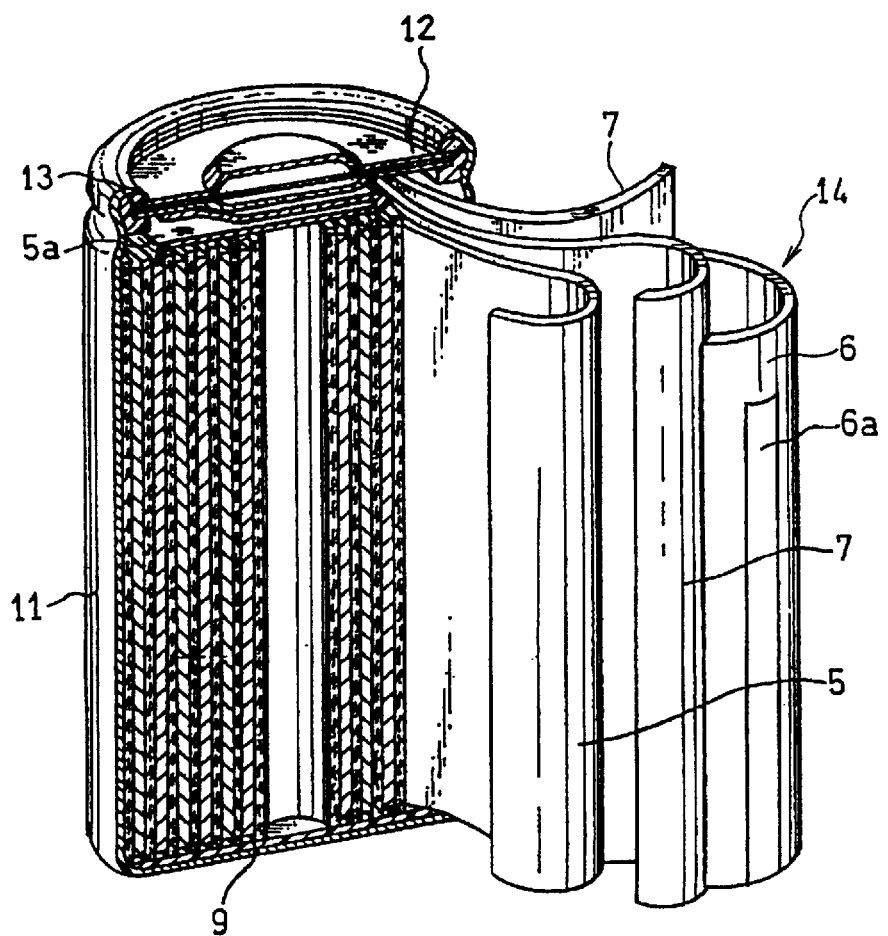

FIG. 2 is a schematic longitudinal cross-sectional view of a cylindrical battery according to one embodiment of the present invention.

The cylindrical battery can be produced by housing an electrode group 14 and an electrolyte (not shown) in a cylindrical battery case 11, and sealing the opening of the battery case 11 with a sealing plate 12.

Specifically, a positive electrode 5 and a negative electrode 6 are spirally wound with a separator 7 interposed therebetween, to form the electrode group 14. The electrode group 14 and a lower insulating plate 9 are housed in the battery case 11. At this time, the lower insulating plate 9 is placed between the bottom of the battery case 11 and a negative electrode lead 6a extended downward from the electrode group 14. The negative electrode lead 6a is resistance-welded to the inner bottom surface of the battery case 11.

An upper insulating ring is placed on the top of the electrode group 14 housed in the battery case 11, and an annular step portion is formed in the upper portion of the battery case 11 above the ring. A sealing plate 12 is laser-welded to a positive electrode lead 5a extended upward from the battery case 11, and then, an electrolyte is injected into the battery case 11.

Subsequently, the positive electrode lead 5a is bent to be housed in the battery case 11, and the sealing plate 12 provided with a gasket 13 at its periphery is placed on the aforementioned step portion. The battery case 11 is sealed by inwardly crimping the opening end thereof. A cylindrical battery can be thus obtained.

(Production Method of Nanofiber Sheet)

The nanofiber sheet can be produced by electrospinning through the steps of: (A) deposing nanofibers on the principal surface of a substrate sheet, to form a porous sheet; and (B) joining a pair of the porous sheets to each other, such that the surfaces having been in contact with the principal surface of the substrate sheet face each other.

The production method of the nanofiber sheet further has the steps of: (a) placing or feeding a substrate sheet into a space where nanofibers are to be formed (a nanofiber-forming space), prior to the step (A); and/or (C) collecting the completed sheet after the step (B).

In the step (a), a long substrate sheet may be conveyed from upstream of the line into the nanofiber-forming space. For forming a pair of porous sheets comprising first and second porous sheets in the step (A), in the step (a), for example, long first and second substrate sheets may be conveyed from upstream toward downstream of the first and second lines, respectively. In the step (A), first and second porous sheets may be formed on the principal surfaces of the first and second substrate sheets, respectively, on the upstream side of the lines, so that in the step (B), the first and second porous sheets are joined face to face on the downstream side of the lines.

The surface of the porous sheet having been in contact with the principal surface of the substrate sheet is deformed a little, and the fibers there are flattened, as the shape of the principal surface of the substrate sheet is transferred thereto. By joining a pair of the porous sheets, with the surfaces in such a state facing each other, the average maximum fiber diameter Dc of the nanofibers at the center portion in the thickness direction of the obtained nanofiber sheet can be made larger than the average maximum fiber diameters Ds1 and Ds2 of the nanofibers in the vicinities of the first and second surfaces.

On the other hand, at the surface of the porous sheet not having been in contact with the principal surface of the substrate sheet, the nanofibers are not flattened, and the maximum fiber diameter in the plane direction of the porous sheet is maintained small. By joining such that the surfaces of the porous sheets having been in contact with the principal surface of the substrate sheet are joined each other, the surfaces of the porous sheets on the opposite side at which the maximum fiber diameter in the plane direction of the porous sheet is maintained small can be the first and second surfaces of the nanofiber sheet. Therefore, when the nanofiber sheet is used as a battery separator, the contact area with the electrodes can be reduced, and the contact resistance can be reduced.

(A) Step of Forming Porous Sheet

The porous sheet can be formed by electrospinning. Specifically, the step (A) of forming a porous sheet may be a step of, in the nanofiber-forming space, forming nanofibers by electrostatic force from a liquid raw material including a polymeric material such as a resin raw material (a polymer as exemplified above), and depositing the formed nanofibers on the principal surface of the substrate sheet to form a porous sheet having a matrix structure of nanofibers.

The liquid raw material may be a molten matter of resin raw material, or a solution containing a solvent and a resin raw material dissolved in the solvent. A known additive may be added to the liquid raw material, if necessary.

The solvent may be any solvent in which a resin raw material can be dissolved and which can be removed by volatilization, and can be selected as appropriate depending on the type of the resin raw material. The solvent may be various organic solvents, examples of which include: ketones, such as acetone; nitriles, such as acetonitrile; amides, such as N,N-dimethylformamide; ethers, such as tetrahydrofuran; sulfoxides, such as dimethylsulfoxide; and NMP. Preferred is an aprotic polar solvent.

In electrospinning, nanofibers are formed through a phenomenon called electrostatic stretching. For example, in the case where the liquid raw material is a solution containing a resin raw material, the electrically charged liquid raw material effused into the space gradually loses its solvent through evaporation while traveling in the space. In association with this, the volume of the traveling liquid raw material gradually decreases. On the other hand, the electric charge applied to the liquid raw material remains in the liquid raw material. As a result, the charge density of the liquid raw material traveling in the space gradually increases. When Coulomb force, which is generated in the liquid raw material and acts oppositely, exceeds the surface tension of the liquid raw material by increasing the charge density, the liquid raw material is explosively stretched into filaments. This is the phenomenon called electrostatic stretching. According to electrostatic stretching, nanofibers with fiber diameters ranging from submicron order to nanometer order can be efficiently produced.

In the case where the liquid raw material is a molten matter of resin raw material, by applying a high voltage to the liquid raw material effused into the nanofiber-forming space, the charge density of the liquid raw material can be enhanced. The principle in the subsequent formation of nanofibers is almost the same as mentioned above.

The fiber diameter of the formed nanofibers are dependent on the state of the liquid raw material, the structure of an ejector, the intensity of the magnetic field formed by a charging unit, and other factors. Therefore, in the step of forming a porous sheet, two or more electrospinning units may be used to form different nanofibers in each unit. For example, two or more kinds of nanofibers differing in fiber diameter may be successively formed on the principle surface of the substrate sheet. Alternatively, the fiber diameter of the nanofibers to be deposited on the principal surface may be gradually reduced as distance away from the substrate sheet. One possible method of providing such a gradation is to use two or more electrospinning units for forming nanofibers differing in fiber diameter.

For example, in the step (A), a first electrospinning unit disposed upstream of the line and a second electrospinning unit disposed downstream of the line may be used to form nanofibers. In this case, a porous sheet with varying fiber diameters in its thickness direction can be formed.

Specifically, the fiber diameter of the nanofibers formed by the first electrospinning unit disposed upstream can be intentionally made larger than that of the nanofibers formed by the second electrospinning unit. Conversely, the fiber diameter of the nanofibers formed by the first electrospinning unit disposed upstream can be intentionally made smaller than that of the nanofibers formed by the second electrospinning unit. It is to be noted, however, that the fiber diameter tends to be larger around the boundary between the substrate sheet and the porous layer formed of nanofibers. Therefore, in the case of varying the fiber diameter of the porous layer, forming nanofibers with larger fiber diameter on the upstream side is more effective for achieving a desired structure.

After the porous sheet has been formed, the substrate sheet is removed from the porous sheet. Therefore, the production method of a nanofiber sheet may include a step (a2) of removing the substrate sheet in the step (A) or after the step (A).

The type of the substrate sheet is not limited. For easy removal from the porous sheet, a coating with a releasing agent, or a known releasing treatment such as surface roughening may be applied to the principal surface of the substrate sheet.

(B) Step of Joining Porous Sheets

The formed porous sheet is subjected to the joining step (B). In the joining step (B), a pair of porous sheets are joined to each other, such that the surfaces having been in contact with the principal surface of the substrate sheet face each other, to form a nanofiber sheet.

In the step (B), in place of a pair of porous sheets, one porous sheet may be used by being folded, with the surface having been in contact with the principal surface of the substrate sheet on the inside. The folded edge may be cut, if necessary.

In the step (B), a first porous sheet and a second porous sheet prepared separately may be joined to each other, with the surfaces having been in contact with the principal surface of the substrate sheet facing each other.

Furthermore, first and second porous sheets may be formed in parallel, so that they are joined continuously to each other, with the surfaces having been in contact with the principal surface of the substrate sheet facing each other. Specifically, the first and second porous sheets may be conveyed from upstream on the first and second lines, respectively, so that the conveyed first and second porous sheets are joined to each other on the downstream side of the lines, with the surfaces having been in contact with the principal surface of the substrate sheet facing each other.

In the case of using a molten matter of resin raw material in the step (A), joining may be performed before the nanofibers are completely solidified at least at or near the surface of the porous sheet having been in contact with the principal surface of the substrate sheet, so that the nanofibers of one of the porous sheets and the nanofibers of the other of the porous sheets are fused to one another.

In the case of using a solution of resin raw material, joining is performed while the nanofibers contain the solvent at least at or near the surface of the porous sheet having been in contact with the principal surface of the substrate sheet, so that the nanofibers of one of the porous sheets and the nanofibers of the other of the porous sheets are welded to one another.

The joining of a pair of porous sheets may be performed by a known joining method using thermal compression or an adhesive.

The production method of a nanofiber sheet is more specifically described below, with reference to the appended drawings.

The production method of a nanofiber sheet including, for example, the steps of:

(i) feeding a substrate sheet into a nanofiber-forming space;

(ii) in the nanofiber-forming space, forming nanofibers by electrostatic force from a raw material solution including a solvent and a raw material solution dissolved in the solvent and depositing the formed nanofibers on the principal surface of the substrate sheet, to form a porous sheet having a matrix structure of nanofibers; and (iii) joining a pair of the porous sheets to each other, with surfaces having been in contact with the principal surface of the substrate sheet facing each other to form a nanofiber sheet having a first surface and a second surface opposite to the first surface. The first and second surfaces correspond to the surfaces of the pair of the porous sheets not having been in contact with the principal surface of the substrate sheet.

In the step (iii), one of the porous sheets may be joined to the other of the porous sheets while the solvent is contained at least at or near of the surface of the porous sheet having been in contact with the principal surface of the substrate sheet, so that the nanofibers of one of the porous sheets and the nanofibers of the other of the porous sheets are welded to one another.

Figure 3:
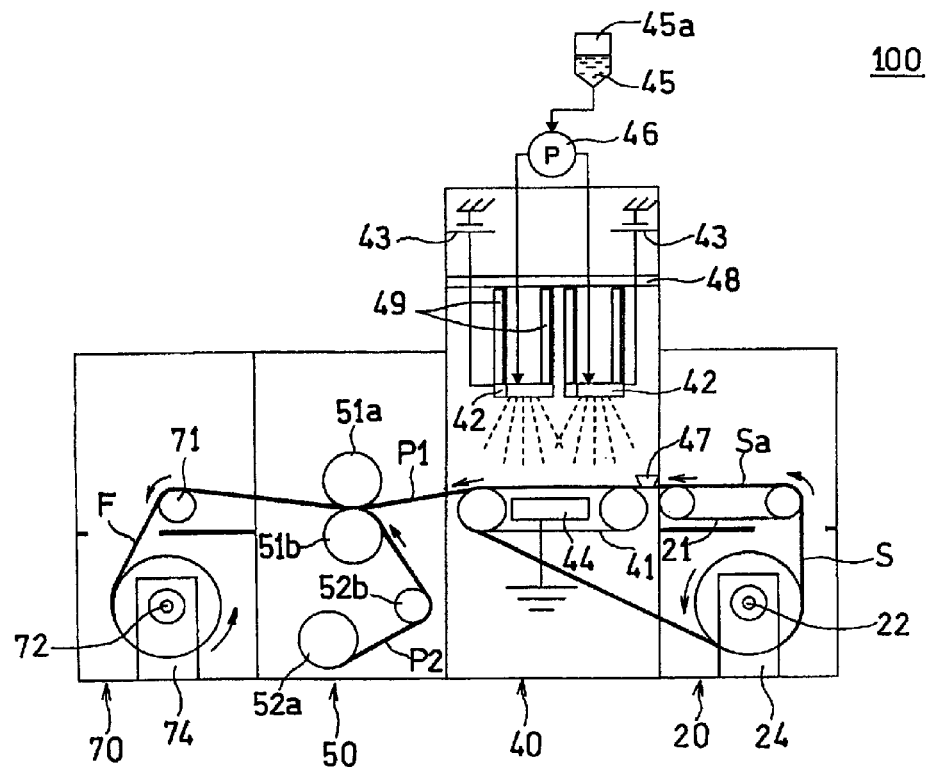

FIG. 3 is a schematic view of a production system for carrying out a production method of a battery separator (or nanofiber sheet) according to one embodiment of the present invention.

A production system 100 of FIG. 3 constitutes a production line for producing a nanofiber sheet. In the production system 100, a substrate sheet S is conveyed from upstream toward downstream of the production line. On the substrate sheet S being conveyed, a porous sheet P1 is formed continuously.

Disposed most upstream of the production system 100 is a substrate-sheet-feeding unit 20 in which a roll of the substrate sheet S is placed. The substrate-sheet-feeding unit 20 unwinds the substrate sheet S from the roll and feeds the substrate sheet S to another unit adjacent thereto on its downstream side. Specifically, the substrate-sheet-feeding unit 20 rotates a feed reel 22 by driving a motor 24, to feed the substrate sheet S, which has been wound on the feed reel 22, onto a first feed conveyor 21.

The unwound substrate sheet S is transferred via the first feed conveyor 21 to a porous-sheet-forming unit 40. The porous-sheet-forming unit 40 is equipped with an electrospinning mechanism. More specifically, the electrospinning mechanism includes: an ejector 42 for ejecting a raw material solution, disposed on the upper side in the unit; a charging unit for electrically charging the ejected raw material solution; and a second feed conveyor 41 for feeding the substrate sheet S from upstream toward downstream so as to face the ejector 42. The second feed conveyor 41 functions as a collector member for collecting nanofibers, together with the substrate sheet S.

The charging unit comprises a voltage application device 43 for applying voltage to the ejector 42, and a counter electrode 44 disposed in parallel with the second feed conveyor 41. The counter electrode 44 is grounded. This provides a potential difference (e.g., 20 to 200 kV), depending on the voltage applied by the voltage application device 43, between the ejector 42 and the counter electrode 44. There is no particular limitation on the configuration of the charging unit, and, for example, the counter electrode 44 may not be necessarily grounded. Alternatively, instead of providing the counter electrode 44, for example, the belt portion of the second feed conveyor 41 may be formed of a conductor.

The ejector 42 is formed of a conductor and is long in shape and hollow inside. The hollow serves as a container for containing a raw material solution 45. The ejector 42 is provided with a plurality of ejection ports on the side facing the substrate sheet S. The ejection ports are provided at constant intervals in a regular pattern. The raw material solution 45 is fed from a raw material solution tank 45a into the hollow of the ejector 42, by the pressure from a pump 46 disposed in communication with the hollow of the ejector 42. The raw material solution 45 is ejected by the pressure from the pump 46 through the ejection ports toward the principal surface Sa of the substrate sheet S. The ejected raw material solution electrostatically explodes while traveling in an electrically charged state in the space between the ejector 42 and the second feed conveyor 41, to form nanofibers. The formed nanofibers are attracted to the principal surface Sa of the substrate sheet S by electrostatic attraction force, and deposit thereon. In that way, a porous layer (nonwoven fabric) made of nanofibers is formed.

On the most upstream side of the second feed conveyor 41, a squeegee 47 to come in contact with the principal surface Sa of the substrate sheet S may be disposed. The squeegee 47 serves to remove the irregularities and wrinkles from the principal surface Sa of the substrate sheet S prior to the depositing of nanofibers thereon. This allows the substrate sheet S to come in close contact with the surface of the belt portion of the second feed conveyor 41. Consequently, the nanofibers deposit uniformly on the principal surface Sa of the substrate sheet S, without being locally concentrated. Therefore, the surface of the formed porous layer is flattened, and the thickness of the porous layer tends to be uniform.

The belt portion of the second feed conveyer 41 may be made of a dielectric material. In the case where the belt portion is formed of a conductor as mentioned above, the deposited nanofibers tend to be somewhat concentrated on the collector member near the ejection ports of the ejector 42. In view of dispersing the nanofibers more uniformly on the collector member, the belt portion of the second feed conveyor 41 is preferably made of a dielectric material. In the case where the belt portion is made of a dielectric material, the counter electrode 44 may be disposed in contact with the inner circumferential face of the belt portion (the face opposite to the face to come in contact with the substrate sheet S). Such contact causes dielectric polarization inside the belt portion, which generates a uniform electrical charge on the contact surface with the substrate sheet S. This further reduces the possibility of local concentration of the deposited nanofibers on the principal surface Sa of the substrate sheet S.

Figure 4A:
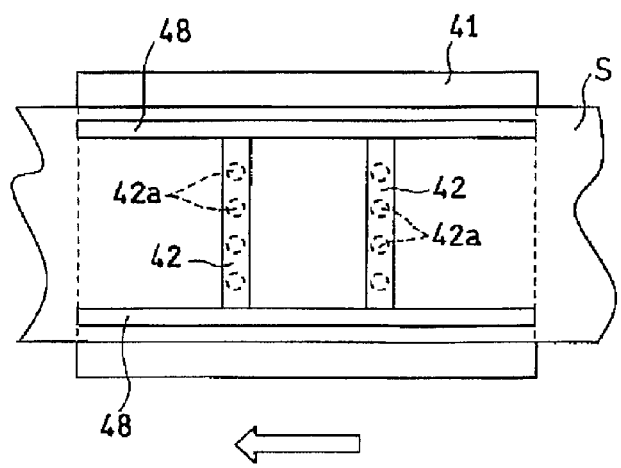
FIG. 4B A schematic top view of another porous-sheet-forming unit 40

FIG. 4A is a schematic top view of the porous-sheet-forming unit 40. In the porous-sheet-forming unit 40, the ejector 42 is disposed perpendicular to the moving direction (the direction of the open arrow in FIG. 4A) of the substrate sheet S. The ejector 42 is supported, with the longitudinal direction thereof being aligned in parallel with the principal surface Sa of the substrate sheet S, by a second support 49 extending downward from a first support 48 which is disposed on the upper side of the porous-sheet-forming unit 40 in parallel with the moving direction of the substrate sheet S.

Figure 4B:
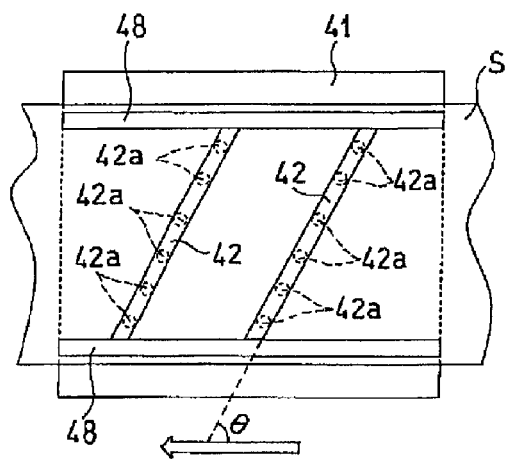

FIG. 4B is a schematic top view of another porous-sheet-forming unit 40. In FIG. 4A, the ejector 42 is disposed perpendicular to the moving direction of the substrate sheet S, and in FIG. 4B, the ejector 42 is disposed so as to obliquely cross the moving direction (the direction of the open arrow in FIG. 4B) of the substrate sheet S. The oblique arrangement of the ejector 42 increases the area where the second feed conveyor 41 and the ejector 42 face each other, and thus can enhance the productivity of the porous layer. The acute angle θ formed by the ejector 42 and the arrow is not particularly limited, but is preferably about 30 to 60° for sufficiently improving the productivity.

In FIGS. 4A and 4B, a plurality of ejection ports 42a of a raw material solution are provided on the ejector 42 on the side facing the principal surface Sa of the substrate sheet S. By arranging the ejection ports 42a in a regular pattern on the ejector 42, nanofibers can be deposited on the principal surface Sa of the substrate sheet S in a uniform amount over a wide area of the principal surface Sa. As for the distance between the ejection ports 42a of the ejector 42 and the substrate sheet S, although depending on the scale of the nanofiber sheet production system, it suffices if it is, for example, 100 to 600 mm.

Figure 5:
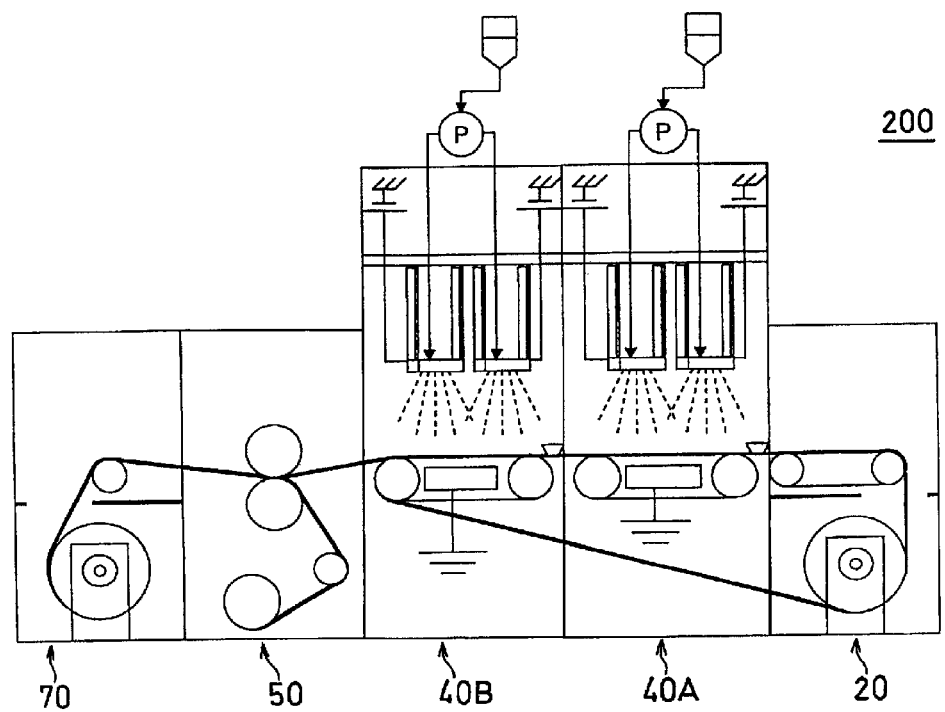
FIG. 5 A schematic illustration of a production system for carrying out a production method of a nanofiber sheet (or battery separator) according to one embodiment of the present invention FIG. 6 A schematic illustration of a production system for carrying out a production method of a nanofiber sheet (or battery separator) according to one embodiment of the present invention

In FIG. 3, the production system includes only one porous-sheet-forming unit 40, and two ejectors 42 per one porous-sheet-forming unit 40. There is no particular limitation, however, on the number of the porous-sheet-forming units 40 and the number of the ejectors 42 included in one porous-sheet-forming unit 40. For example, as shown in FIG. 5, two porous-sheet-forming units 40 may be disposed side by side to constitute a production system 200. In other words, a set of two porous-sheet-forming units 40 may be used to function as one electrospinning mechanism. In this case, the electrospinning mechanism is regarded as having a first electrospinning unit 40A disposed upstream of the line and a second electrospinning unit 40B disposed downstream of the line.

In the aforementioned production system, the units are detachably configured. Therefore, the number of units can be easily changed. Likewise, a unit (not shown) having an additional function may be disposed so as to be interposed between any adjacent units.

In the case where the electrospinning mechanism includes a first electrospinning unit disposed upstream of the line and a second electrospinning unit disposed downstream of the line, the same or different nanofibers may be formed in each unit. In the case of forming the same nanofibers, it is possible, for example, to increase the thickness of the porous sheet, or to increase the speed of the substrate sheet S moving on the production line so that the production tact can be improved. On the other hand, in the case of forming different nanofibers, it is possible, for example, to form nanofibers differing in fiber diameter, thereby to form a porous sheet comprising two or more different fiber layers.

Here, when the fiber diameter of the nanofibers formed by the first electrospinning unit disposed upstream is intentionally made larger than that of the nanofibers formed by the second electrospinning unit, the substrate-sheet-S side of the porous sheet can be formed of nanofibers with large fiber diameter, and the side opposite to the substrate sheet S can be formed of nanofibers with smaller fiber diameter.

By joining porous sheets having such a structure, with the substrate-sheet-S side surfaces facing each other, to form a nanofiber sheet, the average maximum fiber diameter Dc of the nanofibers at the center portion in the thickness direction of the nanofiber sheet can be made larger, and at the same time, the average maximum fiber diameters Ds1 and Ds2 of the nanofibers in the vicinities of the first and second surfaces can be made smaller.

In the case of forming a porous sheet comprising two or more different fiber layers, the number of the different fiber layers is not particularly limited, but is preferably two to five, and more typically, two to three.

In the porous-sheet-forming unit 40, after the porous sheet P1 has been formed on the surface of the substrate sheet S, the porous sheet P1 is conveyed in the direction of the arrow in the figure to the next step, while the substrate sheet S is removed from the porous sheet P1 and collected on the substrate-sheet-S feed reel 22.

In FIG. 3, at the point where the substrate sheet S goes away (is separated) from the second feed conveyor 41, a dielectrification device for dielectrifying the substrate sheet S may be provided in order to suppress sparks that could occur when the substrate sheet S is separated from the roll of the second feed conveyor 41. Furthermore, near the window portion between the porous-sheet-forming unit 40 and each unit adjacent thereto, a suction duct for sucking nanofibers may be provided in order to prevent the nanofibers formed in the nanofiber-forming space from being released outside.

The porous sheet (first porous sheet) P1 transferred from the porous-sheet-forming unit 40 is conveyed to a porous-sheet-joining unit 50 disposed further downstream. At this time, the porous sheet P1 is conveyed such that the surface not having been in contact with the substrate sheet S1 will come in contact with the peripheral surface of a pressure roller 51a of a pair of pressure rollers 51a and 51b. Simultaneously, the porous-sheet-joining unit 50 feeds a second porous sheet P2 in the direction of the arrow in the figure between the pair of the pressure rollers 51a and 51b, such that the second porous sheet P2 covers the surface of the porous sheet P1 being conveyed. At this time, the first and second porous sheets P1 and P2 are fed such that the surfaces having been in contact with the substrate sheets are brought to face each other. The first porous sheet P1 is preferably in such a condition that the surface is dry, while the substrate-sheet-S side is a little wet.

The porous-sheet-joining unit 50 accommodates the second porous sheet P2 which is wound in a roll on a feed reel 52a with the surface having been in contact with the substrate sheet facing outside. The second porous sheet P2 is unwound by a guide roller 52b which has an axis of rotation orthogonal to the moving direction of the first porous sheet P1, and a peripheral surface parallel to the first porous sheet P1. The unwound second porous sheet P2 is conveyed between the pair of the joining rollers 51a and 51b, so as to be stacked with the first porous sheet P1. The first and second porous sheets P1 and P2 stacked together are passed through the gap between the pair of the joining rollers 51a and 51b, whereby the first and second porous sheets P1 and P2 are compressed and integrated into a nanofiber sheet.

During the compressing of the first and second porous sheets P1 and P2, if the first porous sheet P1 contains the solvent at or near of its surface, the fibers at the surface of the first porous sheet P1 are welded with those of the second porous sheet P2, due to the action of the solvent. The second porous sheet P2 may also contain the solvent at or near its surface. The compressing between the joining rollers 51a and 51b may be performed under heating.

The completed nanofiber sheet F is collected in a collector unit 70 via a guide roller 71. The collector unit 70 incorporates a collector reel 72 for taking up the conveyed nanofiber sheet F. The collector reel 72 is rotationally driven by a motor 74.

In the production system as illustrated in FIG. 3, the rotating speed of the motor 24 of the substrate-sheet-feeding unit 20 and the motor 74 for driving the collector unit 70 by which the nanofiber sheet is to be collected is controlled such that the conveying speed of the substrate sheet S and the conveying speed of the porous sheets passing through the production line become constant. By controlling as above, the substrate sheet S and the porous sheet are conveyed with a predetermined tension applied thereto. Such control is done by a controller (not shown) equipped in t comprehensively control and manage the units constituti he production system 100. The controller is adapted to ng the production system 100.

A preparatory collector member may be disposed between the porous-sheet-joining unit 50 and the nanofiber sheet collector unit 70. The preparatory collector member is provided to ease the collecting of the completed nanofiber sheet F by the collector unit 70. Specifically, the preparatory collector member collects the completed nanofiber sheet F transferred from the porous-sheet-joining unit 50, in a loose state without being wound until the length of the collected nanofiber sheet reaches a given length. During that time, the collector reel 72 of the collector unit 70 is stopped rotating. Every time when the length of the nanofiber sheet F collected in a loose state by the preparatory collector member reaches a given length, the collector reel 72 of the collector unit 70 is allowed to rotate for a predetermined period of time, so that the nanofiber sheet F is taken up on the collector reel 72. Such a preparatory collector member eliminates the necessity of controlling the rotating speeds of the motors 24 and 74 included in the substrate-sheet-feeding unit 20 and the nanofiber sheet collector unit 70 in precise synchronization with each other, and can simplify the controller of the production system 100.

It is to be noted that the aforementioned production system of a nanofiber sheet is merely one exemplary production system that can be used for carrying out the production method of a nanofiber sheet (or battery separator) of the present invention. The production method of a nanofiber sheet is not particularly limited, and may be any method that includes the steps of: in a nanofiber-forming space, forming nanofibers and depositing the formed nanofibers on the principal surface of the substrate sheet to form a porous sheet having a matrix structure of nanofibers; and joining a pair of the porous sheets to each other, with surfaces having been in contact with the substrate sheet facing each other, to form a nanofiber sheet.

The step of feeding a substrate sheet into the nanofiber-forming space is not limited to a step of unwinding the substrate sheet S from the roll and feeding the substrate sheet S to the most upstream of the production line by a substrate-sheet-feeding unit. For example, it is possible to use a production line integrated with a unit for producing the substrate sheet S. In this case, the substrate sheet S, immediately after production, may be fed as it is to the porous-sheet-forming unit.

In the step of forming a porous sheet also, it is possible to use any electrospinning mechanism that can form nanofibers by electrostatic force from a raw material solution and deposit the formed nanofibers on the principal surface of the substrate sheet S, in a predetermined nanofiber-forming space. For example, there is not particular limitation on the shape of the ejector. The shape of the cross section perpendicular to the longitudinal direction of the ejector may be a shape gradually narrowing from top to bottom (V-shaped nozzle). The ejector may be a rotating body.

Specifically, the ejector may be formed as a hollow annular body like a bicycle tire tube, and a raw material solution may be contained in the hollow. Providing the hollow annular body with a plurality of ejection ports along its outer peripheral surface and rotating the annular body about its center as an axis allow the raw material solution to be ejected from the ejection ports by centrifugal force. In this case, the moving direction of the raw material solution in the space is controlled by, for example, air-blowing, and the nanofibers can be deposited on a predetermined collector member.

Moreover, the step of joining the first and second porous sheets may be performed by any method.

The production method of a nanofiber sheet of the present invention is particularly suitable for producing a battery separator, but can be utilized for producing a nanofiber sheet for various applications.

In the aforementioned embodiments, description is made supposing that the substrate sheet S is a long sheet. The present invention, however, is applicable when the substrate sheet S is a rectangular sheet. In this case, the substrate-sheet-feeding unit may be, for example, one that places rectangular substrate sheets successively on the first feed conveyor. Such a substrate-sheet-feeding unit, if provided with a tray feeder in which a plurality of rectangular substrate sheets S are placed, can efficiently feed the substrate sheets S.

Furthermore, the nanofiber sheet can be produced by a method in which: long first and second substrate sheets are conveyed from upward toward downward of first and second lines, respectively, to form first and second porous sheets on the principal surfaces of the first and second substrate sheets on the upstream side of the lines, respectively; and the first and second porous sheets are joined face to face on the downstream side of the lines.

The method includes, for example, the steps of:

(i) conveying the first and second substrate sheets into nanofiber-forming spaces on the upstream side of the first and second lines, respectively;

(ii) in the nanofiber-forming spaces, forming nanofibers by electrostatic force from a raw material solution including a solvent and a resin raw material dissolved in the solvent, and depositing the formed nanofibers on the principal surfaces of the conveyed first and second substrate sheets, respectively, to form first and second porous sheets each having a matrix structure of nanofibers;

(iii) removing the first and second substrate sheets from the conveyed first and second porous sheets, on the downstream side of the first and second lines; and (iv) joining the conveyed first and second porous sheets to each other on the further downstream side of the first and second lines, with the surfaces having been in contact with the principal surfaces of the first and second substrate sheets facing each other, to form a nanofiber sheet.

In the step (iv), the first and second porous sheets may be joined to each other while the solvent is contained at least at or near the surfaces having been in contact with the principal surfaces of the first and second substrate sheets, so that the nanofibers of the first porous sheet and those of the second porous sheet are welded to one another.

Figure 6:
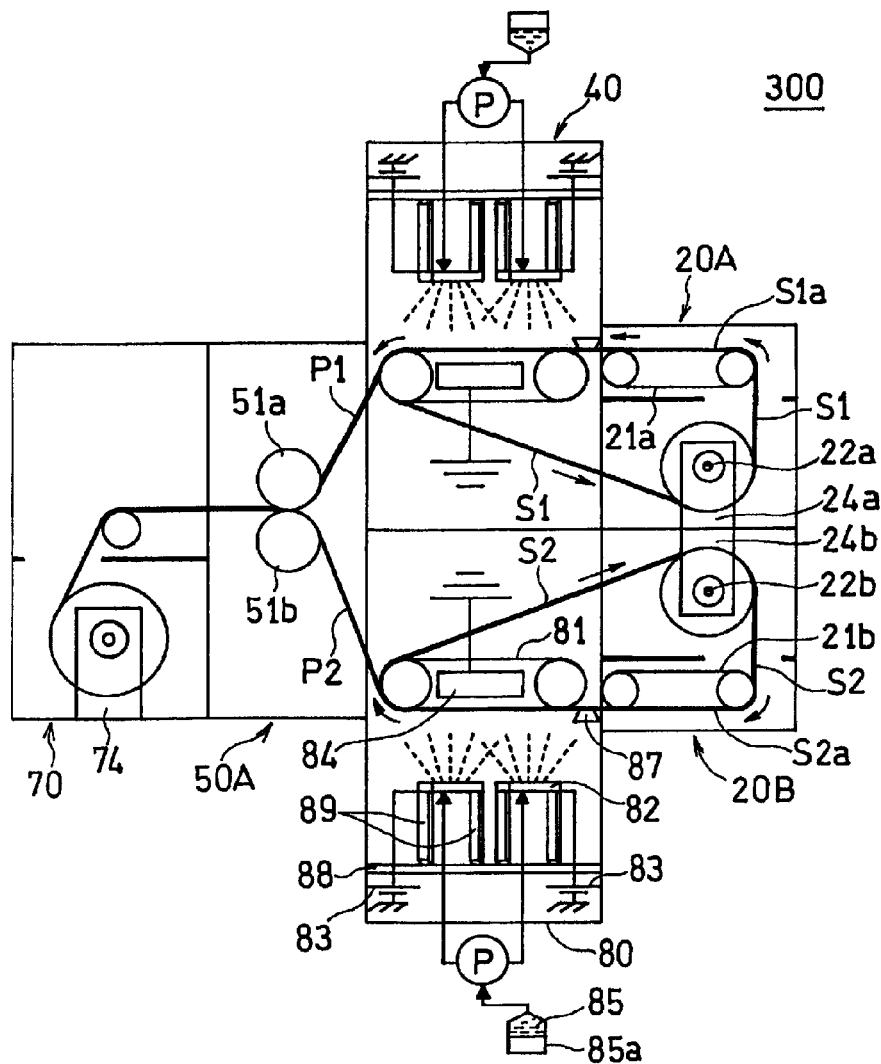

FIG. 6 is a schematic illustration of a production system for carrying out a production method of a battery separator (or nanofiber sheet) according to one embodiment of the present invention.

A production system 300 of FIG. 6 includes a substrate-sheet-feeding unit 20A disposed most upstream of the first line, and a substrate-sheet-feeding unit 20B disposed most upstream of the second line.

The production system 300 of FIG. 6 is similar to the production system 100 of FIG. 3, except that the second porous sheet P2 is produced in parallel with and in a similar manner to the first porous sheet and fed continuously between the pair of the joining rollers 51*a* and 51*b*, instead of being fed from the feed reel 52*a* of the porous-sheet-joining unit 50 in the production system 100 of FIG. 3.

In FIG. 6, for convenience, the porous-sheet-joining unit is denoted by a reference number 50A, and the substrate-sheetfeeding unit and the components thereof are indicated as a substrate-sheet-feeding unit 20A, a feed reel 22a, and a first feed conveyor 21a. The substrate-sheet-feeding unit 20A rotates the feed reel 22a by driving a motor 24a, to feed a first substrate sheet S1, which has been wound on the feed reel 22a, onto a first feed conveyor 21a. The unwound first substrate sheet S1 is transferred via the first feed conveyor 21a to the porous-sheet-forming unit 40, such that a principal surface S1a is brought to face the ejector 42 in the porous-sheet-forming unit 40. In the porous-sheet-forming unit 40, the first porous sheet P1 is formed.

The second porous sheet P2 is formed in a similar manner to the first porous sheet P1. Specifically, it is formed as follows. First, the substrate-sheet-feeding unit 20B feeds a second substrate sheet S2, which has been wound on a feed reel 22b, onto a first feed conveyor 21b, by the rotation of a feed reel 22b driven by a motor 24b. The first feed conveyor 21b transfers the unwound second substrate sheet S2 to a porous-sheet-forming unit 80 located downstream of the substrate-sheet-feeding unit 20B of the second line. In the porous-sheet-forming unit 80, a porous sheet (second porous sheet P2) is formed by a mechanism similar to that of the porous-sheet-forming unit 40.

In the porous-sheet-forming units 40 and 80 located downstream of the first and second lines, respectively, the formed first and second porous sheets P1 and P2 are transferred via feed conveyors 41 and 81, respectively, to the subsequent step. The first and second substrate sheets S1 and S2 are removed from the porous sheets P1 and P2, and collected on the feed reels 22a and 22b, respectively.

Disposed further downstream of the first and second lines is a porous-sheet-joining unit 50A. The first porous sheet P1 conveyed from the porous-sheet-forming unit 40 of the first line and the second porous sheet P2 conveyed from the porous-sheet-forming unit 80 of the second line are fed between the pair of the joining rollers 51a and 51b, with the surfaces having been in contact with the principal surfaces S1a and S2a of the first and second substrate sheets S1 and S1, respectively, facing each other.

In the porous-sheet-joining unit 50A, like the joining mechanism in the porous-sheet-joining unit 50 in FIG. 3, the first and second porous sheets P1 and P2 are passed through the gap between the pair of the joining rollers 51a and 51b, whereby they are compressed and integrated into a nanofiber sheet.

The completed nanofiber sheet F is collected by the collector unit 70, as in the case of FIG. 3.

In the production system as illustrated in FIG. 6, in accordance with the case of FIG. 3, a controller (not shown) may be used to control the conveying speed of the substrate sheets S1 and S2, the porous sheets P1 and P2, and the like, to be constant. Moreover, similarly to the above, a preparatory collector member may be disposed between the porous-sheet-joining unit 50A and the nanofiber sheet collector unit 70.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

[Industrial Applicability]

According to the present invention, it is possible to obtain a nanofiber sheet (nonwoven fabric) which has a matrix structure of nanofibers (nanofiber nonwoven fabric structure) formed by electrospinning, but despite this, in which the average maximum fiber diameters in the vicinities of both surfaces thereof are smaller than the average fiber diameter at the center portion in the thickness direction of the sheet. Such a nanofiber sheet has excellent surface properties and no significant difference between the properties of both surfaces, and therefore, can be suitably used as a battery separator. The nanofiber sheet is usable not only as a battery separator but also as a filter or ion exchange membrane, and in various fields such as those of medical materials, sensors, catalysts, and reinforcing materials.

[Reference Signs List]

1: Nanofiber sheet, 1a: First surface, 1b: Vicinity of first surface, 2a: Second surface, 2b: Vicinity of second surface, P1: First porous sheet, P2: Second porous sheet, 3a: Joining face, 3: Center portion in thickness direction of nanofiber sheet,

5: Positive electrode, 5a: Positive electrode lead, 6: Negative electrode, 6a: Negative electrode lead, 7: Separator, 9: Lower insulating plate, 11: Battery case, 12: Sealing plate, 13: Gasket, 14: Electrode group,

100, 200 and 300: Production system of nanofiber sheet (battery separator)

20, 20A and 20B: Substrate-sheet-feeding unit, 21, 21a and 21b: First feed conveyer, 22, 22a and 22b: Feed reel,

40 and 80: Porous-sheet forming unit, 40A: First electrospinning unit, 40B: Second electrospinning unit, 41 and 81: Second feed conveyer, 42 and 82: Ejector, 42a: Ejection port, 43 and 83: voltage application device, 44 and 84: Counter electrode, 45 and 85: Raw material solution, 45a and 85a: Raw material solution tank, 46 and 86: Pump, 47 and 87: Squeegee, 48 and 88: First support, 49 and 89: Second support,

50 and 50A: Porous-sheet-joining unit, 51a and 51b: Joining roller, 52a: Feed reel, 52b: Guide roller,

70: Collector unit, 71: Guide roller, 72: Collector reel,

S: Substrate sheet, S1: First substrate sheet, S2:

Second substrate sheet, Sa: Principal surface of substrate sheet, S1a: Principal surface of first substrate sheet, S2a: Principal surface of second substrate sheet, and F: Nanofiber sheet (battery separator)

The invention claimed is:

1. A method for producing a battery separator in a production line, in which:

long first and second substrate sheets are conveyed from upward toward downward of first and second lines of the production line, respectively, to form first and second porous sheets on principal surfaces of the first and second substrate sheets on the upstream side of the lines, respectively; and the first and second porous sheets are joined face to face on the downstream side of the lines, the method comprising the steps of:

(i) conveying the first and second substrate sheets into nanofiber-forming spaces on the upstream side of the first and second lines, respectively;

(ii) in the nanofiber-forming spaces, forming nanofibers by electrostatic force from a raw material solution including a solvent and a resin raw material dissolved in the solvent, and depositing the formed nanofibers on the principal surfaces of the conveyed first and second substrate sheets, respectively, to form first and second porous sheets each having a plurality of nanofibers;

(iii) removing the first and second substrate sheets from the conveyed first and second porous sheets, on the downstream side of the first and second lines; and (iv) joining the conveyed first and second porous sheets to each other on the further downstream side of the first and second lines, with surfaces having been in contact with the principal surfaces of the first and second substrate sheets facing each other, to form a nanofiber sheet, wherein the steps (i) to (iv) are continuously performed in the production line.

2. The method for producing a battery separator according to claim 1, wherein in the step (iv), the first and second porous sheets are joined to each other while the solvent is contained at least at or near the surfaces having been in contact with the principal surfaces of the first and the second substrate sheets, so that the nanofibers of the first porous sheet and the nanofibers of the second porous sheet are welded to one another.

* * * * *